Patented Aug. 7, 1945

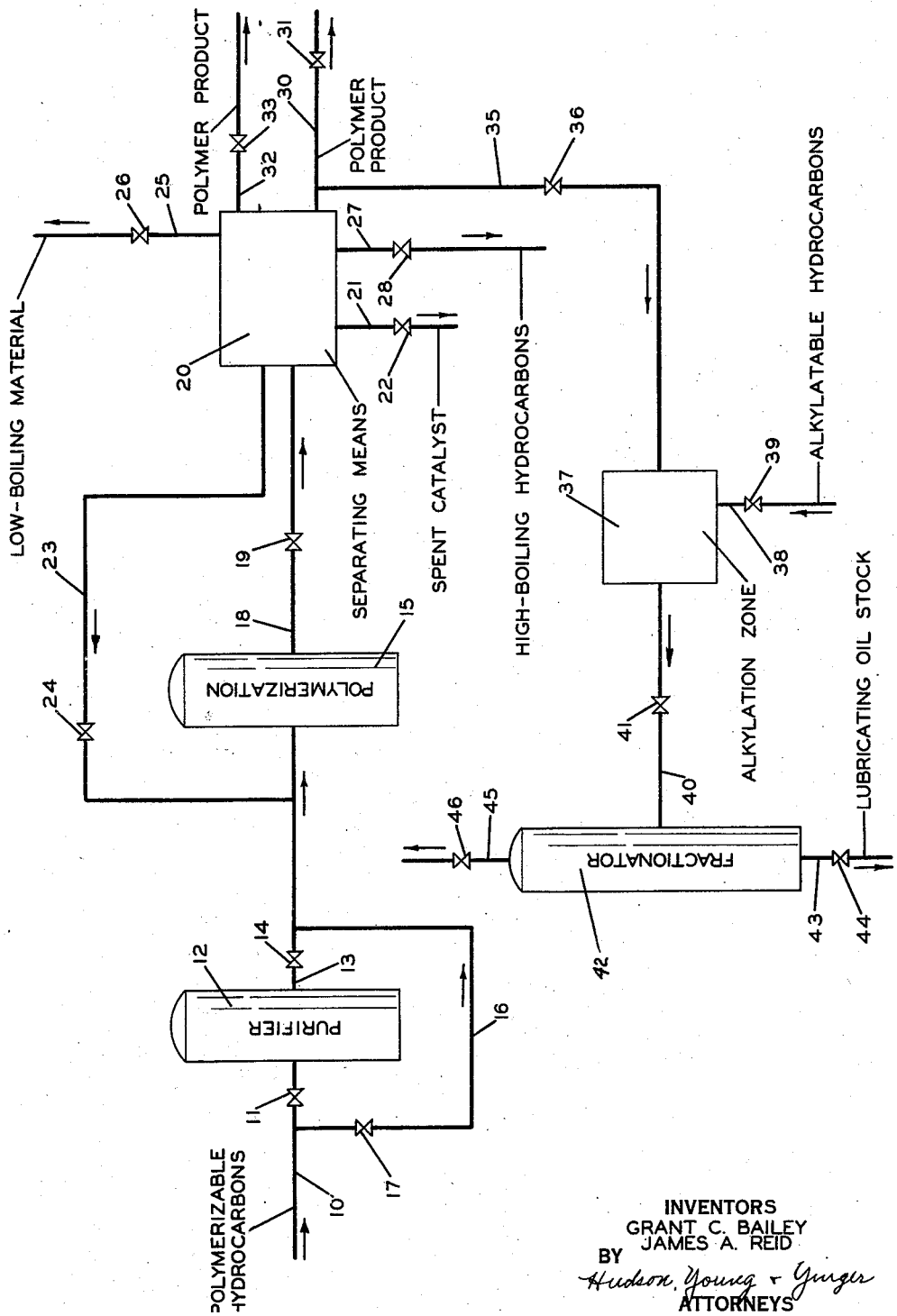

2,381,198

UNITED STATES PATENT OFFICE 2,381,198

CATALYTIC POLYMERIZATION OF OLEFINS

Grant C. Bailey and James A. Reid, Bartlesville, Okla., assignors to Phillips Petroleum Company, a corporation of Delaware Application March 23, 1942, Serial No. 435,888

23 Claims. (Cl. 260—683.15)

This invention relates to the production of valuable hydrocarbons, and in particular to the catalytic polymerization of olefins.

The conversion of olefins to hydrocarbons of higher molecular weight by polymerization reactions is well known. In some instances, such polymerizations may be accomplished solely by the application of heat and pressure, but in many cases the use of a catalyst is desirable. In general, catalysts cause polymerizations to proceed at lower temperatures, decrease the number and, types of polymeric materials formed, and increase the yield of desired products. Many individual catalysts already have been found that are active for the polymerization of olefins. These include active earths, such as Floridin; acids, such as sulfuric, phosphoric, and hydrofluoric; the active metal halides, such as aluminum chloride, boron fluoride, zirconium tetrachloride, and the like; and also other materials, among which are phosphoric anhydride and silica-alumina gel. It has been established that no catalyst is the exact equivalent of any other catalyst and that products differing not only in molecular weight, but also in molecular structure may be prepared through the use of different catalysts, when polymerizing the same olefins.

We have now found a new and useful catalytic system for the polymerization of olefins to higher molecular weight hydrocarbons.

An object of this invention is to provide a catalytic polymerization system for the conversion of olefins to products within a desired molecular weight range.

Another object of this invention is to provide a catalytic system for the conversion of olefins to polymers which possess desired physical and chemical properties.

Another object of this invention is to convert olefins to polymers possessing limited branched chain structures.

Another object of this invention is to polymerize olefins to products containing substantially no tertiary-base olefins.

Another object of this invention is to polymerize low-boiling olefin hydrocarbons.

Other objects and advanatges of our invention will become apparent from the accompanying disclosure and discussion.

We have now found that olefins can be polymerized by means of a catalyst comprising an active form of a metal oxide, said metal being a member of the iron group in group VIII of the periodic system, and said metal oxide being activated by heating to a temperature above about 400° C., to form simple olefin hydrocarbon polymers.

As the metal oxide we prefer to use nickel oxide, although one or more of the oxides of the iron group metals including iron, cobalt, and nickel oxides may be used alone or in combination with one another. We prefer to use the catalyst supported on material possessing extensive surface area such as kieselguhr, alumina, charcoal and the like, although it may be used without a support when prepared in a sufficiently active state.

The catalyst may be prepared by a wide variety of chemical routes, the essential step being a final treatment at a temperature in the range of about 400 to 700° C., for a length of time of about one-half to 12 hours.

Catalysts highly active for the polymerization of olefins to simple polymers have been prepared by us from basic nickel carbonate precipitated on kieselguhr, such as is commonly used for the preparation of nickel hydrogenation catalysts. The carbonate can be reduced to metallic nickel by heating to a temperature in the range of 300 to 400° C. in a stream of hydrogen. This reduced nickel, which is a highly pyrophoric active hydrogenation catalyst, can be converted to a polymerization catalyst by heating it to a temperature in the range of 400 to 700° C. and at least partially oxidizing it, as in a stream of oxygen diluted with an inert gas such as nitrogen. This oxidation step is highly exothermic, and without suitable precautions the actual temperatures in the interior of the catalyst mass may greatly exceed the temperatures indicated externally; thus under such conditions active catalysts have been prepared by heating in a furnace in which the indicated temperature was as low as 300° C. or even lower, although we believe that actual temperatures within the mass were appreciably higher. The best results are obtained, however, by keeping the catalyst at a uniform, controlled temperature during this oxidation step. This can be accomplished by agitating the catalyst and using an oxygen-nitrogen mixture containing from about one to ten per cent oxygen. Under these conditions local overheating is prevented, and uniform oxidation is obtained. The extent of oxidation under these conditions is not critical. Active polymerization catalysts have prepared using as little as ten per cent and as much as 500 per cent of the amount of oxygen theoretically necessary to combine with the metallic nickel initially present to form NiO, although the activity apparently passes through a maximum when treated with about 100 to 150 per cent of oxygen theoretically required to form this oxide.

The reduction and oxidation steps just described are not always essential in the preparation of active polymerization catalysts from nickel carbonate on kieselguhr. The carbonate may be decomposed to nickel oxide by heating in a stream of air, or in a dilute mixture of oxygen in an inert gas such as introgen, or in a stream of an inert gas such as nitrogen, or in vacuo. In all such cases the resultant nickel oxide is catalytically active if the decomposition has been carried out at a temperature in the range of about 400 to 700° C., or if the nickel oxide is heated to a temperature in this range after the decomposition has been completed at a lower temperature. Catalysts that have been treated with oxygen in this activating temperature range have somewhat higher activity and longer life than those prepared in the absence of oxygen.

In order to prepare an active catalyst it is not necessary to use the metal carbonate, nor is it essential that the catalyst be supported on kieselguhr. Active catalysts have been prepared by depositing the nitrate of the metal, such as nickel, on alumina, decomposing the nitrate in a stream of nitrogen in the temperature range of 350 to 375° C., and then heating the oxide thus produced to a temperature in the range of 400 to 700° C. in a stream of diluted oxygen.

Other salts of the herein designated metals which decompose to the metal or metal oxide on heating to temperatures in the range of about 100 to 500° C., supported on these or other materials such as charcoal, pumice, magnesia, and the like, may likewise be used in the preparation of catalysts.

The polymerization temperature in particular cases may vary within a rather wide range, which, however, will generally not be much lower than about 0° C., nor appreciably above about 225° C., and we have found it preferable to operate within the range of about 50 to 150° C.

High pressures favor the polymerization reaction, but under suitable conditions the reactions may be carried out under a very wide range of pressures, from as low as atmospheric or below, to as high as 2,000 p. s. i. or above. High pressures not only increase the rate of polymerization, but also increase the average molecular weight of the polymer formed.

The polymerizations using our catalyst may be carried out in either liquid or gas phase. In gas phase polymerization, the reaction must be carried out under conditions whereby the exothermic heat of reaction does not cause excessive local overheating of the catalyst, or a general rise in temperature above the desired operating range. This can be accomplished by suitable design of a catalyst chamber to allow good heat transfer, and by controlling the rate of introduction of charge stock. In many cases liquid phase operation is preferred, and pressures such as to insure substantial or complete liquid phase operation are advantageous. Liquid phase operation facilitates control of reaction temperature and contributes to catalyst life by diminishing the deposition of high molecular weight, or other non-volatile or insoluble, materials on the catalyst surface. When polymerizing an olefin or olefinic material above its critical temperature, it is often desirable to insure that a liquid phase is present by carrying out the reaction in the presence of an inert higher boiling material, especially a higher boiling normal paraffin or cycloparaffin. A diluent, either higher or lower boiling than the charge, may also be advantageously used in other cases in which the polymerization temperature is not above the critical temperature of the olefin or olefin mixture being polymerized.

The polymerization catalysts of our invention are readily deactivated or poisoned by various materials, such as sulfur compounds, carbon monoxide, some halogen compounds, organic oxygen-containing compounds, and the like. It is thus desirable, in order to secure satisfactory catalyst life, to exclude such materials from the system. The charge stock to the system should be previously treated to remove any materials which might bring about rapid deactivation of the catalyst. The removal of these materials may be accomplished by any means, suitably adapted to the particular case, such as fractionation, extraction with adsorbents or solvents, chemical treatment, and the like. We have found, however, that for best results from our catalyst, extreme purification of the charge is desirable, in order to remove the smallest traces of poisonous materials. For example, an olefinic charge, containing less than 0.5 per cent of nonolefinic reactive material, and with not more than a trace of sulfur compounds, could not be polymerized in our system, whereas by passing this charge through a bed of nickel on kieselguhr hydrogenation catalyst at 200° C., and through a sodium hydroxide on asbestos adsorbent at room temperature, more satisfactory polymerization was obtained. We have also found that the charge to our polymerization catalyst can be purified by contacting it with a metal which forms alkyl derivatives reactive with water, such as sodium, commingled with a metal selected from the iron group which is active as a catalyst for hydrogenation reactions, such as nickel, at a temperature between 50 and 150° C. Such a purification process is more specifically disclosed in our copending application Serial No. 430,834, filed February 13, 1942.

We have found the activity of our polymerization catalyst is increased by polymerizing in the presence of an alkali or alkaline earth metal. The metals may be finely divided, but are preferably in liquid state to obtain the most intimate contact between metal and reactants. In order to obtain liquid metals at the operating temperature, alloys or amalgams of the alkali or alkaline earth metals may be used. When using the catalyst in the presence of a metal such as sodium or potassium, the maximum temperature of operation is limited by the reaction of the olefin and the metal. For example, ethylene readily reacts with sodium at temperatures above about 200° C. producing an inactive constituent in the system. The exact mechanism by which these added metals increase the polymerization activity is not known, but it may be that they act as superpurification agents and remove from the catalytic system traces of materials that are not removed in the pre-treatment of the charge.

It is desirable to establish intimate contact between the reactants and the catalytic materials, in order to obtain the most rapid reaction. Vigorous agitation has been found a satisfactory means of establishing the necessary contact, although other means, such as rapid flow of the reactants through the catalyst mixture may also be employed. The time of contact between olefinic reactants and our catalyst to produce polymerization may vary over a wide range. We have found that a contact time as low as 30 seconds at atmospheric pressure and in the preferred temperature range is sufficient to polymerize most olefins to an appreciable extent. However, higher extents of conversion are possible when a longer contact time and/or higher pressures are utilized under similar temperature conditions. Contact times of 3 and even 12 hours are not uncommon when poylmerizing olefins in the presence of our catalyst.

Polymers are formed when operating within the temperature range previously discussed, but the temperature for optimum yield depends to some extent upon the olefin charged and the catalyst used; however, it can readily be determined by trial for any specific charge stock and/or any specific catalyst preparation.

A wide variety of olefinic compounds may be converted to polymers in our catalytic systems. The olefins which are converted to polymers most satisfactorily are the low-boiling olefins, such as ethylene, propylene, butenes, and the like.

The product obtained, and the extent of conversion, may vary considerably with the olefin used as charge stock. For example, in a system containing nickel oxide catalyst together with normal pentane diluent and a minor proportion of metallic sodium, ethylene was converted to liquid polymer from which a minor proportion of solid wax-like material was separated on chilling. Propylene polymer prepared under similar conditions was found to comprise mainly mono-olefins containing 6, 9, and 12 carbon atoms per molecule. Isobutylene was converted at a relatively moderate rate at a temperature of 30° C. to polymers ranging from dimers to viscous oils. Other olefins, such as butene-2, pentene-1, and the like, were also found to be polymerized by our catalysts.

The olefinic polymers obtained by the conversion of olefins using our metal oxide catalyst appear to result from simple, straight forward polymerization, and may range from dimers to high molecular weight solid hydrocarbons. These products usually contain no tertiary-base olefins, or at most only a minor proportion, unless the olefinic charge contains tertiary-base olefins. There is also a minimum of chain branching, as is indicated by the waxy nature of the high molecular weight ethylene polymers. No cyclic or aromatic hydrocarbons are produced under the preferred conditions of operation. The unsaturated bond in the polymer molecules is usually at or near the terminal position. It is thus apparent that the olefins are converted to polymeric products in this system by simple polymerization without isomerization, hydrogenation, or other changes. These polymers thus differ significantly from those produced by using other catalysts, such as acids, metal halides and the like; the latter polymers contain generally tertiary-base olefins, extensive chain branching, internal unsaturation, and so forth, and frequently undergo isomerization, cyclization and other secondary changes.

In some cases the total polymer may be used as produced, but it is generally desirable to separate it into various fractions, for use in specific applications. Some of these fractions may be used as raw materials for the synthesis of valuable organic compounds, or they may be further polymerized using catalysts such as aluminum chloride, to produce polymers in the viscosity range of lubricating oils, or fractions of the product may be hydrogenated and used as a fuel for internal combustion engines, or used in any other application wherein mono-olefins or their derivatives are desired.

The operation of a particular modification of our invention will now be described in connection with the accompanying drawing, which shows diagrammatically by means of a flow sheet an arrangement of apparatus suitable for the practice of our invention.

An olefin-containing charge stock from any suitable source, not shown, is charged through pipe 10 controlled by valve 11 to a purifier 12 wherein any undesired reactive constituents deleterious to our polymerization catalyst such as those previously discussed, are removed. The purified olefinic material is passed from purifier 12 through pipe 13 controlled by a valve 14 to a polymerization zone 15. The polymerization zone 15 will comprise one or more catalytic polymerization chambers with associated heating or cooling and temperature control means as may be found necessary in any particular application of our invention. These polymerization chambers may be batch-type chambers in which olefinic material is vigorously stirred with a mixture of a catalyst, chambers in which a stationary body of catalyst is employed and in which the olefinic material is polymerized continuously, or the like. When the initial charge stock does not contain undesirable reactive material, the purifier 12 need not be used, in which case the charge is passed directly from pipe 10 through pipe 16 controlled by a valve 17 to polymerization zone 15, valves 11 and 14 being closed.

The polymerized material passes from polymerization zone 15 through a pipe 18 controlled by valve 19 to separating means 20 which will comprise cooling and heating devices, fractionating columns, filtering equipment, and the like suitable for the particular type of operation employed. When a flowing catalyst is used in the form of a slurry, or the like, all or a part of the catalyst may be present in the material passing through pipe 18 and the removal of such material as well as fractionation of the products is included within the separations carried out in separating means 20. Spent catalysts and/or catalysts suitable for recycle to the polymerization zone may be removed through pipe 21 controlled by a valve 22 for revivification and/or regeneration as may be necessary. Unreacted olefins and olefin polymers lower boiling than those desired in the product may be separated and returned to the polymerization zone through a pipe 23 controlled by valve 24. Any undesired low-boiling material such as low-boiling paraffins, which may accompany or be added to the olefins charged to the polymerization zone, may be removed through pipe 25 controlled by a valve 26. Other hydrocarbon material, and/or any tar or sludge-like material, may be discharged from the system through a pipe 27 controlled by a valve 28. One or more polymer fractions having a desired boiling range or other desired characteristics may be recovered from the system as products in suitable streams represented by the material passing through pipe 30 controlled by a valve 31 and through pipe 32 controlled by valve 33.

As will be shown more specifically by examples presented hereinafter, the polymers produced by the practice of our invention range from dimers and trimers to polymers having molecular weights within and above those corresponding to hydrocarbons in the lubricating oil range. The low-boiling polymers may be used as such, as special solvents or as raw materials for subsequent chemical conversion operations. It is a feature of our invention that, especially with certain low-boiling olefins, the polymer products are essentially straight chain, aliphatic hydrocarbons with a negligible amount of branching, and in such cases the low-boiling polymers are not suitable for use as high octane number fuel stocks, although in some instances in which low octane product is desirable or suitable, the polymers may be so used. Some of the higher boiling polymers in the lubricating oil range are wax-like and may be used as substitutes for naturally occurring waxes, especially after a complete saturation as by non-destructive hydrogenation. Because of their characteristics of being solid under ordinary conditions such wax-like polymers are not suitable for use directly as lubricating oils, but may be readily converted into lubricating oils or stocks by any one of a number of processes which may include partial depolymerization with polymerization of the olefins so formed in the presence of another catalyst such as zirconium tetrachloride, alkylation of an isoparaffin or of an aromatic hydrocarbon, alkylation or polymerization in a metal halide-catalyzed system, and the like. Polymers which are lower boiling than such wax-like products may also be converted into lubricating oils as by polymerization with a suitable metal halide catalyst, alkylation of other hydrocarbon materials, or the like.

When it is desired to convert such a polymer product to a lubricating oil stock, this may be accomplished by passing the selected polymer fraction from a pipe 30 through a pipe 35 controlled by a valve 36 to a second reaction zone 37 wherein a further chemical conversion, such as herein discussed, takes place. When it is desired to alkylate polymer product with another hydrocarbon material, such as an aromatic hydrocarbon from an outside source, such a hydrocarbon material may be passed to reaction zone 37 through a pipe 38 controlled by a valve 39. When a catalyst is used in zone 37 it may be charged thereto in admixture with the material charged through pipe 38 or through other means not shown in the drawing. The effluent of reaction zone 37 is passed through a pipe 40 controlled by a valve 41 to a suitable separating means illustrated by fractionating column 42 wherein any desired separation of this effluent into a lubricating oil stock and one or more other fractions may be obtained. A desired lubricating oil stock is recovered as a product of the combined process through a pipe 43 controlled by a valve 44, and other fractions separated from the effluent of the reaction zone are recovered through one or more outlets represented by a pipe 45 controlled by a valve 46.

It is to be appreciated that the flow diagram described is diagrammatic only; the various pieces of equipment illustrated and discussed are conventional in nature, and in any application of our invention there will be associated with the individual units shown various pumps, heaters, coolers, reflux accumulators, heat exchangers, fractionating columns, temperature indicating and control devices, and the like, known in the art and which may be suitably supplied for any particular case by one skilled in the art following the teachings of the reaction conditions and material flows disclosed and discussed herein.

Example I

A polymerization catalyst was prepared in the following manner: Basic nickel carbonate was precipitated on refined kieselguhr by slowly adding sodium carbonate solution to a well stirred suspension of the kieselguhr in a very dilute solution of nickel nitrate. The solid material was separated from the liquid by filtration, thoroughly washed, and dried. The resultant dried material, which contained 35 per cent nickel by weight, was placed in a glass tube in an electric furnace and a stream of hydrogen gas passed through the tube. The temperature of the furnace was gradually increased from room temperature to 400° C. over a period of four hours, after which time the nickel compound on the kieselguhr was completely reduced. The hydrogen in the system was swept out by passing a stream of nitrogen gas through for 20 minutes. A mixture of air and nitrogen was then passed over the nickel-containing material, the mixture being adjusted to contain two per cent oxygen by volume. This treatment was continued, holding the temperature constant at 600° C. until a quantity of oxygen had been passed over sufficient to oxidize 100 per cent of the metallic nickel to nickel oxide (NiO). The oxidation required four hours time. The absorption of oxygen was about 80 per cent complete, as confirmed by increase in weight of the catalyst during this treatment. The resultant catalyst was then cooled in a stream of nitrogen. One part by weight of the catalyst and two parts of normal pentane were charged to a pressure autoclave of one liter capacity in the presence of an atmosphere of nitrogen. The normal pentane had been purified by pumping over a nickel-on-kieselguhr hydrogenation catalyst at 200° C. and then through a tube containing sodium hydroxide-asbestos absorbent. The autoclave was sealed and heated to 105–110° C. Commercial ethylene from a cylinder was purified by passing it over a reduced nickel-on-kieselguhr catalyst under about 700 pounds per square inch pressure at a temperature of about 150° C., through a bed of sodium hydroxide-asbestos absorbent, and then added to the autoclave until the total pressure was 600 pounds per square inch. The contents of the autoclave were continuously agitated and the temperature was held as specified. Ethylene was added at frequent intervals to maintain the pressure at the original value. After two hours the autoclave was cooled and the contents carefully removed. Approximately 1 part of polymer was separated from the products.

Approximately 35 per cent by volume of the polymer consisted of butene-1 and butene-2 in a ratio of 1 to 2. No isobutylene could be detected in the product. The $C_4$-hydrocarbon-free polymer was fractionated yielding cuts having the following characteristics.

| Fraction | Volume per cent | Distilling temperature, °C. | Density | Refractive index |
|---|---|---|---|---|
| 1 | 36.4 | 66–68 | 0.679 | 1.3953 |
| 2 | 27.2 | 121–123 | 0.723 | 1.4154 |
| 3 | 12.7 | 165–175 | 0.752 | 1.4290 |
| 4 | 14.5 | 175–225 | 0.783 | 1.4450 |
| Residue | 9.2 | Above 225 | | |
| | 100.0 | | | |

The residue contained a substantial proportion of olefinic polymer melting above 30° C. It was noted that each fraction boiled within a narrow range, indicating the presence of only one, or a very few, molecular species in each fraction, and that a negligible amount of material was present between the fractions shown in the table.

Example II

The procedure of the preceding run was repeated, except that no hydrocarbon solvent or diluent was added to the catalyst mixture prior to the introduction of ethylene. The products of the experiment were substantially the same as before, although the reaction rate was reduced to less than one-half that observed with liquid pentane in the system.

Example III

The procedure cited in Example I was repeated except that one-twentieth of one part by weight of sodium metal was added to the polymerization system. The products of the system were substantially the same as before, although 2 parts of polymer were produced in a 2 hour period. A major proportion of the metallic sodium was recovered unchanged.

Example IV

The procedure as in Example III was repeated except that the catalyst was prepared in the following manner. The nickel carbonate on kieselguhr was heated to a temperature of about 350° C. and was decomposed to nickel oxide in a stream of 5 per cent oxygen in nitrogen. After the decomposition was complete, the temperature was increased to 600° C., and the catalyst was held at this temperature for one hour.

The activity of this catalyst was substantially the same as that of the catalyst previously made by oxidizing reduced nickel.

Example V

The procedure as in Example III was repeated except that the catalyst was prepared in the following manner. The nickel carbonate on kieselguhr was heated to a temperature of about 350 C. and was decomposed in vacuo. After the decomposition was complete, the temperature was increased to 600° C., and the catalyst was held at this temperature for one and one-half hours. The catalyst was charged to the autoclave without allowing it to come into contact with air.

The initial activity of this catalyst was about three-fourths that of catalysts previously prepared in the presence of oxygen. The life of this catalyst, as indicated by the time necessary for the rate of polymerization to decrease to one-half its initial value, was about one-half the life of catalysts prepared in the presence of oxygen.

Example VI

The procedure as in Example III was repeated except that the catalyst was prepared in the following manner. Five parts by weight of nickel nitrate hexahydrate was deposited on three parts of pelleted activated alumina by heating and agitating until the water of crystallization was driven off. The nitrate was decomposed to the oxide by heating to a temperature of 300–375° C. in a stream of air. The temperature was then increased to 600° C., and a mixture of 2 per cent oxygen in nitrogen was passed over the catalyst for one hour.

The activity of this catalyst was about one-twentieth that of the catalyst of Example I.

Example VII

A nickel oxide catalyst was prepared as described in Example I except that the carbonate was pelleted before the reduction step.

This catalyst, after activation was placed in a tube and was heated to a temperature of about 50° C. Purified ethylene at atmospheric pressure was passed over the catalyst at a rate of about 2.5 volumes of ethylene per volume of catalyst per minute. Approximately 15 per cent of the ethylene was converted to polymer consisting of about 90 per cent of a mixture of butene-1 and butene-2. The remainder of the polymer was higher molecular weight mono-olefins.

Example VIII

One part by weight of metallic sodium, 17 parts of a catalyst prepared by partially oxidizing a reduced nickel-on-kieselguhr hydrogenation catalyst, and 25 parts of purified normal pentane were placed in a pressure autoclave. Seventy-five parts of purified propylene was pumped into the autoclave. The whole was heated to 110° C. and held between 110 and 115° C. for 12 hours while the contents were continuously agitated. The maximum vapor pressure of the system attained during this period was about 1400 pounds per square inch. The autoclave was cooled and the contents carefully removed. The product was fractionated yielding cuts having the following characteristics:

| Fraction | Volume, per cent | Distilling temperature, °C. | Density | Refractive index |
| --- | --- | --- | --- | --- |
| 1 | 6 | 54–55 | 0.664 | 1.385 |
| 2 | 20 | 58 | 0.6664 | 1.3885 |
| 3 | 43 | 152.1 | 0.6798 | 1.3965 |
| 4 | 31 | Above 153 | | |
|   | 100 | | | |

Titration of the product fractions using bromine solution established them as containing one double bond per molecule. Eighty-five per cent of the metallic sodium charged to the reactor was recovered unchanged.

Example IX

One part of metallic sodium and 15 parts purified normal pentane were placed in a pressure autoclave and heated to 110 to 115° C. Fifty parts of purified propylene were pumped into the autoclave. The temperature was held as specified for 31 hours while the contents were continuously agitated. The autoclave was cooled and the contents carefully removed. The product was distilled without fractionation. Approximately 0.15 per cent of the propylene was converted to polymer under these conditions.

This experiment showed that metallic sodium alone will polymerize only a negligible amount of olefin under the conditions of the reaction.

Example X

One part of a freshly completely reduced nickel-on-kieselguhr hydrogenation catalyst which had not been allowed to come in contact with oxygen after reduction, and two parts of normal pentane were placed in a pressure autoclave of one liter capacity and heated to 110 to 115° C. Purified ethylene was added to the autoclave until the total pressure was 600 pounds per square inch. The temperature was held as specified for 26 hours while being continuously agitated. The autoclave was cooled and the contents carefully removed. No polymer could be detected in the effluent.

This run demonstrated that the nickel-on-kieselguhr hydrogenation catalyst was inactive for the polymerization of ethylene.

It will be appreciated by those skilled in the art that the foregoing examples illustrate our invention, and that limitations of the examples should not serve to restrict our invention unduly. Although the polymerization should be such that only simple polymers are formed, various modifications can be practiced without departing from the spirit of the disclosure or from the scope of the claims.

We claim:

1. A process for converting a normally gaseous olefin hydrocarbon to higher molecular weight aliphatic olefins which comprises passing such an olefin hydrocarbon under polymerization conditions of temperature and pressure such that substantially only aliphatic olefin polymers are produced in contact with a polymerization catalyst prepared by oxidizing nickel at a temperature between 400 and 700° C.

2. A process for preparing normal olefins of high molecular weight, which comprises polymerizing ethylene under polymerization conditions of temperature not greater than about 150° C. and pressure such that substantially only aliphatic olefin polymers are produced in the presence, as the polymerization catalyst, of an oxide of a metal of the iron group which is deposited on a supporting material possessing extensive surface area, said catalyst having been activated by being subjected to a temperature between about 400 and about 700° C., and separating from effluents of said polymerization as a product of the process an olefinic hydrocarbon fraction containing as the sole olefinic constituent normal olefins of higher molecular weight than ethylene so produced.

3. A process for preparing normal olefins of high molecular weight, which comprises polymerizing ethylene under polymerization conditions of temperature not greater than about 150° C. and pressure such that substantially only aliphatic olefin polymers are produced in the presence, as the polymerization catalyst, of nickel oxide which is deposited on a supporting material possessing extensive surface area, said catalyst having been activated by being subjected to a temperature between about 400 and about 700° C., and separating from effluents of said polymerization as a product of the process an olefinic hydrocarbon fraction containing as the sole olefinic constituent normal olefins of higher molecular weight than ethylene so produced.

4. A process for converting ethylene to aliphatic olefin hydrocarbons of higher molecular weight, which comprises passing a hydrocarbon material comprising ethylene at a polymerization temperature and a superatmospheric pressure such that substantially only aliphatic olefin polymers are produced in contact with a polymerization catalyst prepared by oxidizing nickel at a temperature between 400 and 700° C.

5. A process for polymerizing a normally gaseous olefin hydrocarbon to form an aliphatic olefin hydrocarbon of higher-molecular weight, which comprises subjecting a liquid hydrocarbon material comprising such an olefin to a polymerization temperature not greater than about 150° C. under a superatmospheric pressure in the presence of a catalyst comprising finely divided nickel oxide dispersed on a supporting material possessing extensive surface area, said nickel oxide having been activated for said low-temperature olefin polymerization by previous treatment at a temperature between about 400 and about 700° C. for at least about one-half hour in the presence of a gas comprising free oxygen.

6. A process for polymerizing ethylene to form an aliphatic olefin hydrocarbon of higher-molecular weight which comprises subjecting a liquid hydrocarbon material comprising ethylene to a polymerization temperature not greater than about 150° C. under a superatmospheric pressure in the presence of a catalyst comprising finely divided nickel oxide dispersed on a supporting material possessing extensive surface area, said nickel oxide having been activated for said low-temperature ethylene polymerization by previous treatment at a temperature between about 400 and about 700° C. for at least about one-half hour in the presence of a gas comprising free oxygen.

7. The process of claim 5 in which said supporting material is kieselguhr.

8. A process for converting ethylene to aliphatic olefin hydrocarbons of higher molecular weight, which comprises passing a hydrocarbon material comprising ethylene at a polymerization temperature between about 0 and about 150° C. and a superatmospheric pressure such that substantially only aliphatic olefin polymers are produced in contact with a polymerization catalyst prepared by oxidizing finely divided nickel at a temperature between 400 and 700° C., said nickel prior to said oxidation being present in finely divided form resulting from dispersion of a reducible nickel salt on an inert support and subsequent reduction of said salt prior to said oxidation.

9. A process for converting a normally gaseous olefin hydrocarbon to higher molecular weight aliphatic olefins, which comprises passing such an olefin hydrocarbon at a polymerization temperature between about 0 and about 150° C. and a polymerization pressure and such that substantially only aliphatic olefin polymers are produced in contact with a polymerization catalyst prepared by oxidizing finely divided nickel at a temperature between 400 and 700° C., said finely divided nickel resulting from dispersion of a reducible nickel salt on an inert support and subsequent reduction of said salt prior to said oxidation.

10. A process for converting a normally gaseous hydrocarbon to higher molecular weight aliphatic olefins, which comprises passing such an olefin hydrocarbon in liquid phase and at a polymerization temperature between about 0 and about 150° C. and a polymerization pressure such that substantially only aliphatic olefin polymers are produced in contact with a polymerization catalyst comprising nickel oxide and an alkali metal in liquid form, said nickel oxide having been prepared from dispersion of a reducible nickel salt on an inert support, subsequent reduction of said nickel salt to form finely divided nickel, and subsequent oxidation of said finely divided nickel at a temperature between 400 and 700° C.

11. A process for converting a normally gaseous hydrocarbon to higher molecular weight aliphatic olefins, which comprises passing such an olefin hydrocarbon in liquid phase and at a polymerization temperature and pressure such that substantially only aliphatic olefin polymers are produced in contact with a polymerization catalyst comprising an oxide of a metal of the group consisting of iron, nickel and cobalt and an alkali metal in liquid form, said metal oxide having been prepared from dispersion of a reducible salt of said metal on an inert support, subsequent reduction of said metal salt to form the metal in finely divided form, and subsequent oxidation of said finely divided metal at a temperature between 400 and 700° C.

12. A process for converting a normally gaseous olefin hydrocarbon to higher molecular weight aliphatic olefins, which comprises passing such an olefin hydrocarbon under polymerization conditions of temperature and pressure such that substantially only aliphatic olefin polymers are produced in contact with a polymerization catalyst prepared by oxidizing a metal of the group consisting of iron, nickel and cobalt at a temperature between 400 and 700° C.

13. A process for converting ethylene to aliphatic olefin hydrocarbons of higher molecular weight, which comprises passing a hydrocarbon material comprising ethylene at a polymerization temperature and a superatmospheric pressure such that substantially only aliphatic olefin polymers are produced in contact with a polymerization catalyst prepared by oxidizing a metal of the group consisting of iron, nickel and cobalt at a temperature between 400 and 700° C.

14. A process for polymerizing a normally gaseous olefin hydrocarbon to form an aliphatic olefin hydrocarbon of higher-molecular weight, which comprises subjecting a liquid hydrocarbon material comprising such an olefin to a polymerization temperature not greater than about 150° C. under a superatmospheric pressure in the presence of a catalyst comprising a finely divided oxide of a metal of the group consisting of iron, cobalt and nickel dispersed on a supporting material possessing extensive surface area, said metal oxide having been activated for said low-temperature olefin polymerization by previous treatment at a temperature between about 400 and about 700° C. for at least about one-half hour in the presence of a gas comprising free oxygen.

15. An improved process for the production of a normally wax-like aliphatic olefin hydrocarbon material, which comprises subjecting ethylene to polymerization in the presence of a polymerization catalyst comprising finely divided nickel oxide dispersed upon a solid supporting material possessing extensive surface area, said catalyst having been activated for said polymerization by being subjected to a temperature between about 400 and 700° C., at a polymerization temperature not greater than about 150° C. and such that substantially only aliphatic olefin polymers are produced which comprise a normally wax-like aliphatic olefin hydrocarbon material, and separating from effluents of said polymerization as a product of the process a hydrocarbon fraction comprising a normally wax-like aliphatic olefin hydrocarbon material so produced.

16. The process of claim 11 in which said catalyst is prepared by oxidizing cobalt.

17. The process of claim 12 in which said catalyst is prepared by oxidizing cobalt.

18. The process of claim 13 in which said catalyst is prepared by oxidizing cobalt.

19. The process of claim 14 in which said catalyst is prepared by oxidizing cobalt.

20. The process of claim 11 in which said catalyst is prepared by oxidizing iron.

21. The process of claim 12 in which said catalyst is prepared by oxidizing iron.

22. The process of claim 13 in which said catalyst is prepared by oxidizing iron.

23. The process of claim 14 in which said catalyst is prepared by oxidizing iron.

GRANT C. BAILEY.
JAMES A. REID.